US 12,211,434 B2

(12) United States Patent
Kim et al.

(10) Patent No.: US 12,211,434 B2
(45) Date of Patent: Jan. 28, 2025

(54) DETECTING STATIONARY REGIONS FOR ORGANIC LIGHT EMITTING DIODE (OLED) TELEVISION (TV) LUMINANCE REDUCTION

(71) Applicant: SAMSUNG ELECTRONICS CO., LTD., Suwon-si (KR)

(72) Inventors: Joonsoo Kim, Irvine, CA (US); Kamal Jnawali, Tustin, CA (US); Chenguang Liu, Tustin, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/818,679

(22) Filed: Aug. 9, 2022

(65) Prior Publication Data

US 2023/0047673 A1    Feb. 16, 2023

Related U.S. Application Data

(60) Provisional application No. 63/232,900, filed on Aug. 13, 2021.

(51) Int. Cl.
  *G09G 3/3208* (2016.01)
(52) U.S. Cl.
  CPC ... *G09G 3/3208* (2013.01); *G09G 2300/0452* (2013.01); *G09G 2300/0842* (2013.01); *G09G 2320/046* (2013.01)
(58) Field of Classification Search
  CPC .............................................. G09G 2320/046
  See application file for complete search history.

(56) References Cited

U.S. PATENT DOCUMENTS 8,659,617 B2   2/2014   Cho et al.
8,743,291 B2   6/2014   Li et al.
(Continued)

FOREIGN PATENT DOCUMENTS

CN    102625028 B    9/2016
CN    110599418 A    12/2019
(Continued)

OTHER PUBLICATIONS

Cozar, J.R., et al. "Logotype detection to support semantic-based video annotation." Signal Processing: Image Communication, Aug. 2007, pp. 669-679, vol. 22, Issues 7-8, Elsevier B.V., Netherlands.
(Continued)

*Primary Examiner* — William Boddie
*Assistant Examiner* — Bipin Gyawali
(74) *Attorney, Agent, or Firm* — Sherman IP LLP; Kenneth L. Sherman; Steven Laut

(57) ABSTRACT

One embodiment provides a computer-implemented method that includes adaptively adjusting a detection time interval based on stationary region type of one or more stationary regions and a scene length in a video. The method further includes tracking pixels of the one or more stationary regions from a number of previous frames to a current frame in the video in real-time. A minimum and a maximum of max-Red-Green-Blue (MaxRGB) pixel values are extracted from each frame in a scene of the video as minimum and a maximum temporal feature maps for representing pixel variance over time. Segmentation and block matching are applied on the minimum and maximum temporal feature maps to detect the stationary region type.

20 Claims, 13 Drawing Sheets
(11 of 13 Drawing Sheet(s) Filed in Color)

(56) References Cited

U.S. PATENT DOCUMENTS

| | | | |
|---|---|---|---|
| 8,982,963 | B2 | 3/2015 | Gish et al. |
| 9,418,591 | B2 | 8/2016 | Kim et al. |
| 9,691,353 | B2 | 6/2017 | Joo et al. |
| 10,354,575 | B2 | 7/2019 | Yang et al. |
| 10,402,952 | B2 | 9/2019 | Baar et al. |
| 10,657,631 | B2 | 5/2020 | Yip et al. |
| 10,706,774 | B2 | 7/2020 | Lee |
| 10,741,119 | B2 | 8/2020 | Zeng et al. |
| 10,885,384 | B2 | 1/2021 | Michael et al. |
| 11,006,151 | B2 | 5/2021 | Olivier et al. |
| 11,176,646 | B2 | 11/2021 | Tao et al. |
| 11,217,164 | B2 | 1/2022 | Kim et al. |
| 11,301,967 | B2 | 4/2022 | Peri et al. |
| 2004/0247028 | A1* | 12/2004 | Kim ............... H04N 19/139 348/E7.013 |
| 2007/0236410 | A1 | 10/2007 | Shimizu |
| 2008/0111886 | A1 | 5/2008 | Bai |
| 2011/0090959 | A1 | 4/2011 | Wiegand et al. |
| 2012/0057760 | A1* | 3/2012 | Yamamoto ............ G06T 7/238 382/107 |
| 2012/0188262 | A1* | 7/2012 | Rabii ............... G09G 5/393 345/534 |
| 2014/0146071 | A1* | 5/2014 | Kim ............... G09G 3/3225 345/589 |
| 2016/0200254 | A1* | 7/2016 | Raab ............... H04N 23/90 348/148 |
| 2018/0106992 | A1* | 4/2018 | Nakatsuka .......... G02B 21/367 |
| 2019/0082138 | A1 | 3/2019 | Pan et al. |
| 2019/0236761 | A1 | 8/2019 | Cauvin et al. |
| 2019/0238895 | A1 | 8/2019 | Thoreau et al. |
| 2019/0349607 | A1 | 11/2019 | Kadu et al. |
| 2020/0020303 | A1* | 1/2020 | Kim ............... G09G 3/32 |
| 2020/0090301 | A1 | 3/2020 | Kim et al. |
| 2020/0320672 | A1 | 10/2020 | Guermoud et al. |
| 2020/0372860 | A1* | 11/2020 | Kim ............... H04N 5/57 |
| 2020/0394772 | A1 | 12/2020 | Afra |
| 2021/0150812 | A1 | 5/2021 | Su et al. |
| 2021/0166360 | A1 | 6/2021 | Kim et al. |
| 2021/0400229 | A1* | 12/2021 | Chen ............... G06V 20/40 |
| 2021/0407105 | A1* | 12/2021 | Bao ............... G06T 3/4007 |
| 2022/0020319 | A1* | 1/2022 | Lee ............... G09G 3/3208 |
| 2022/0028355 | A1 | 1/2022 | Chun et al. |
| 2023/0050664 | A1 | 2/2023 | Jnawali et al. |
| 2023/0059233 | A1 | 2/2023 | Kim et al. |
| 2023/0127327 | A1 | 4/2023 | Abdelhamed et al. |
| 2023/0351562 | A1 | 11/2023 | Zhao et al. |
| 2023/0360595 | A1 | 11/2023 | Jnawali et al. |
| 2024/0221134 | A1 | 7/2024 | Zhao et al. |

FOREIGN PATENT DOCUMENTS

| | | |
|---|---|---|
| CN | 111050224 A | 4/2020 |
| EP | 1772849 B1 | 8/2012 |
| KR | 10-2017-0037783 A | 4/2017 |
| KR | 10-2017-0049241 A | 5/2017 |
| KR | 10-2019-0019438 A | 2/2019 |
| KR | 10-2019-0053036 A | 5/2019 |
| KR | 10-2020-0078293 A | 7/2020 |
| KR | 10-2279373 B1 | 7/2021 |
| KR | 10-2337829 B1 | 12/2021 |
| KR | 10-2348028 B1 | 1/2022 |

OTHER PUBLICATIONS

Oh, E., et al. "49-2: Hierarchical Logo Detection and Image Processing Algorithm for Preventing OLED Image Sticking." SID Symposium Digest of Technical Papers, May 30, 2018, pp. 643-646, vol. 49. No. 1, Wiley Press Room, United States.

Shin, Y.G., et al., "A novel burn-in potential region detection method using image processing technique", IEEE International Conference on Consumer Electronics (ICCE), Jan. 8, 2017, pp. 215-216, IEEE, United States.

Society of Motion Picture and Television Engineers, "D-Cinema Quality—Reference Projector and Environment", Apr. 6, 2011, RP 431-2:2011, New York {Abstract Only}.

International Telecommunications Union, "Parameter Values for Ultra-High Definition Television Systems for Production and International Programme Exchange", ITU-R rec. BT.2020-1, "Parameter Values for Ultra-High Definition Television Systems for Production and International Programme Exchange", Jun. 2014, pp. 1-8, Geneva, CH.

Kovaleski, R. et al., "High-quality reverse tone mapping for a wide range of exposures," SIBGRAPI, Aug. 26, 2014, pp. 49-56, United States.

Masia, B. et al., "Dynamic range expansion based on image statistics," Multimedia Tools and Applications, Jan. 2017, pp. 631-648, vol. 76, No. 1, United States.

Huo, Y. et al., "Physiological inverse tone mapping based on retina response," The Visual Computer, May 2014, pp. 507-517, vol. 30, No. 5, Springer {Abstract Only}.

Yang, X. et al. "Image correction via deep reciprocating HDR transformation," in Proceedings of the IEEE Conference on Computer Vision and Pattern Recognition (CVPR), Jun. 2018, pp. 1798-1807, IEEE, United States.

Kim, S. et al., "Learning the inverse tone mapping from low dynamic range video to high dynamic range displays using convolutional neural networks," Proceedings of the Asian Conference on Computer Vision (ACCV), Dec. 2, 2018, pp. 395-409, Springer, {Abstract Only}.

Kim, S. et al., "Deep SR-ITM: Joint learning of super-resolution and inverse tone-mapping for 4K UHD HDR applications," Proceedings of IEEE International Conference on Computer Vision (ICCV), 2019, pp. 3116-3125, IEEE, United States {Abstract Only}.

Wang, C. et al., "Deep inverse tone mapping for compressed images," IEEE Access, Jun. 5, 2019, pp. 74558-74569, vol. 7, IEEE, United States.

Eilertsen, G. et al., "HDR image reconstruction from a single exposure using deep CNNS," ACM Transactions on Graphics, Nov. 2017, pp. 1-15, vol. 36, No. 6, United States.

Santos, M. et al., "Single image HDR reconstruction using a CNN with masked features and perceptual loss," ACM Transactions on Graphics, Jul. 2020, ppl. 1-10, vol. 39, No. 4, United States.

Ronneberger, O., et al., "U-net: Convolutional networks for biomedical image segmentation," in MICCAI, Oct. 5, 2015, pp. 234-241, Springer International Publishing Switzerland.

International Telecommunications Union, "Reference Electro-Optical Transfer Function for Flat Panel Displays used in HDTV Studio Production", Mar. 2011, pp. 1-7, Recommendation ITU-R BT.1886, Geneva, CH.

Glorot, X. et al., "Deep sparse rectifier neural networks," Proceedings of the Fourteenth International Conference on Artificial Intelligence and Statistics, 2011, pp. 315-323, v. 15, United States.

Clevert, D-A, et al., "Fast and accurate deep network learning by exponential linear units (ELUs)," ParXiv preprint arXiv:1511.07289, Nov. 23, 2015, pp. 1-14, United States.

Dang-Nguyen, DT., et al., "Raise: A raw images dataset for digital image forensics," in Proceedings of the 6th ACM Multimedia Systems Conference, 2015, MMSys '15, p. 219-224, Association for Computing Machinery, New York, NY, United States, {Abstract Only}.

Wang, Z. et al., "Image quality assessment: from error visibility to structural similarity," IEEE Transactions on Image Processing, Apr. 2004, pp. 600-612, vol. 13, No. 4, IEEE, United States.

Banterle, F. et al., "Advanced High Dynamic Range Imaging", (2nd Edition), Jul. 2017, AK Peters (CRC Press), Natick, MA, USA.

Mantiuk, R. et al., "HDR-VDP-2: A calibrated visual metric for visibility and quality predictions in all luminance conditions", ACM Transactions on Graphics, Jul. 2011, pp. 40:1- 40:13, vol. 30, No. 4, ACM.

International Search Report and Written Opinion dated Nov. 18, 2022 for International Application PCT/KR2022/012361, from Korean Intellectual Property Office, pp. 1-10, Republic of Korea.

Ahn, W. et al., "Flat-region detection and false contour removal in the digital TV display." 2005 IEEE International Conference on Multimedia and Expo, 2005, pp. 1-4, IEEE, United States.

(56) References Cited

OTHER PUBLICATIONS

Oh, E., et al. "Hierarchical Logo Detection and Image Processing Algorithm for Preventing OLED Image Sticking." Symposium Digest of Technical Papers, 2018, p. 643-646, vol. 49. No. 1, United States.

Shin, H-K, et al. "A luminance control method for OLED burn-in prevention using user information." 2022 IEEE International Conference on Consumer Electronics, 2022, pp. 1-2, IEEE, United States.

U.S. Corrected Notice of Allowability for U.S. Appl. No. 18/143,266 mailed May 17, 2024.

International Search Report and Written Opinion dated Nov. 14, 2022 for International Application PCT/KR2022/012147, from Korean Intellectual Property Office, pp. 1-11, Republic of Korea.

U.S. Notice of Allowance for U.S. Appl. No. 18/143,266 mailed Mar. 27, 2024.

U.S. Non-Final Office Action for U.S. Appl. No. 18/143,266 mailed Jan. 3, 2024.

U.S. Corrected Notice of Allowability for U.S. Appl. No. 18/143,266 mailed Apr. 3, 2024.

U.S. Non-Final Office Action for U.S. Appl. No. 17/818,681 mailed Sep. 24, 2024.

Extended European Search Report dated Sep. 4, 2024 for EP Patent Application No. 22856304.6, from European Patent Office, pp. 1-8, Germany.

Marnerides, D., et al., "Expand Net: A Deep Convolutional Neural Network for High Dynamic Range Expansion from Low Dynamic Range Content", Computer Graphics Technology, May 22, 2018, pp. 1-13, vol. 30, No. 2, John Wiley & Sons Ltd., New Jersey.

Kim, D-E., et al., "Learning-Based Low-Complexity Reverse Tone Mapping With Linear Mapping", IEEE Transactions on Circuits and Systems for Video Technology, Feb. 2, 2020, pp. 1-4, vol. 30, IEEE, United States {Abstract Only}.

U.S. Non-Final Office Action for U.S. Appl. No. 17/820,187 mailed Nov. 14, 2024.

* cited by examiner

DETECTING STATIONARY REGIONS FOR ORGANIC LIGHT EMITTING DIODE (OLED) TELEVISION (TV) LUMINANCE REDUCTION

CROSS-REFERENCE TO RELATED APPLICATIONS

This application claims the priority benefit of U.S. Provisional Patent Application Ser. No. 63/232,900, filed Aug. 13, 2021, which is incorporated herein by reference in its entirety.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to organic light emitting diode (OLED) display burn-in, and in particular, to detection of bright stationary pixels and luminance reduction processing to slow OLED burn-in.

BACKGROUND

The OLED display has been recently used in many multimedia devices such as television (TV) and smart phones because it has shown better image contrast and lower power consumption than liquid crystal display (LCD) devices. The OLED display, however, has a major problem, referred to as OLED burn-in, which refers to a non-uniform deterioration pixel region and looks like image ghosting. Generally, the burn-in is generated by the bright stationary pixels. Since the burn-in not only rapidly reduces the lifetime of OLED panel but also causes image quality degradation, it has been a critical problem to be solved.

SUMMARY

One embodiment provides a computer-implemented method that includes adaptively adjusting a detection time interval based on stationary region type of one or more stationary regions and a scene length in a video. The method further includes tracking pixels of the one or more stationary regions from a number of previous frames to a current frame in the video in real-time. A minimum and a maximum of max-Red-Green-Blue (MaxRGB) pixel values are extracted from each frame in a scene of the video as minimum and a maximum temporal feature maps for representing pixel variance over time. Segmentation and block matching are applied on the minimum and maximum temporal feature maps to detect the stationary region type.

Another embodiment includes a non-transitory processor-readable medium that includes a program that when executed by a processor performs adaptively adjusting, by the processor, a detection time interval based on stationary region type of one or more stationary regions and a scene length in a video. Pixels of the one or more stationary regions are tracked, by the processor, from a number of previous frames to a current frame in the video in real-time. A minimum and a maximum of MaxRGB pixel values are extracted, by the processor, from each frame in a scene of the video as minimum and a maximum temporal feature maps for representing pixel variance over time. Segmentation and block matching are applied, by the processor, on the minimum and maximum temporal feature maps to detect the stationary region type.

Still another embodiment provides an apparatus that includes a memory storing instructions, and at least one processor executes the instructions including a process configured to adaptively adjust a detection time interval based on stationary region type of one or more stationary regions and a scene length in a video; track pixels of the one or more stationary regions from a number of previous frames to a current frame in the video in real-time; extract a minimum and a maximum of MaxRGB pixel values from each frame in a scene of the video as minimum and a maximum temporal feature maps for representing pixel variance over time; and apply segmentation and block matching on the minimum and maximum temporal feature maps to detect the stationary region type.

These and other features, aspects and advantages of the one or more embodiments will become understood with reference to the following description, appended claims and accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the nature and advantages of the embodiments, as well as a preferred mode of use, reference should be made to the following detailed description read in conjunction with the accompanying drawings, in which:

FIG. 1 illustrates an example of organic light emitting diode (OLED) display burn-in;

FIGS. 15A-B illustrate examples of the benefit of using both block matching (L1) and normalized cross correlation, according to some embodiments;

DETAILED DESCRIPTION

Figure 1:
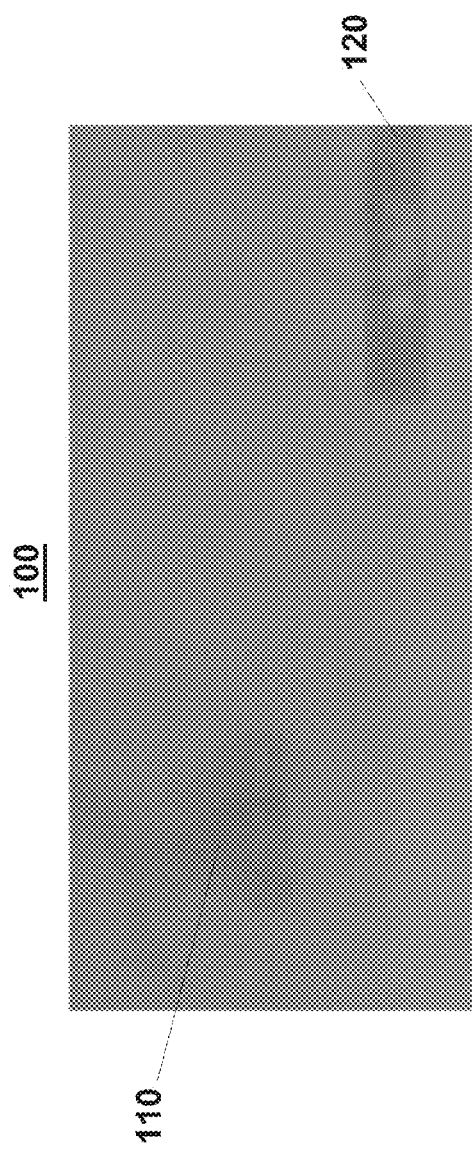

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

A description of example embodiments is provided on the following pages. The text and figures are provided solely as examples to aid the reader in understanding the disclosed technology. They are not intended and are not to be construed as limiting the scope of this disclosed technology in any manner. Although certain embodiments and examples have been provided, it will be apparent to those skilled in the art based on the disclosures herein that changes in the embodiments and examples shown may be made without departing from the scope of this disclosed technology.

One or more embodiments relate generally to organic light emitting diode (OLED) display burn-in, and in particular, to detection of bright stationary pixels and luminance reduction processing to slow OLED burn-in. One embodiment provides a computer-implemented method that includes adaptively adjusting a detection time interval based on stationary region type of one or more stationary regions and a scene length in a video. The method further includes tracking pixels of the one or more stationary regions from a number of previous frames to a current frame in the video in real-time. A minimum and a maximum of max-Red-Green-Blue (MaxRGB) pixel values are extracted from each frame in a scene of the video as minimum and a maximum temporal feature maps for representing pixel variance over time. Segmentation and block matching are applied on the minimum and maximum temporal feature maps to detect the stationary region type.

Since the burn-in not only rapidly reduces the lifetime of OLED panels but also causes image quality degradation, it has been a critical problem to be solved. Detecting the bright stationary pixels such as logos becomes very important for display processing so that luminance reduction can further be applied on the stationary region to slow down burn-in.

Some embodiments include adaptive stationary detection time interval: utilizing multiple scene information for stationary regions detection, including adaptively adjusting the detection time interval based on a stationary region type and a scene length in a video. One or more embodiments include tracking stationarity regions of every pixel from N previous scenes to current frame in real time: using one or more frame buffers (e.g. 2×(N+1)) to obtain one or more temporal features for detecting one or more stationary regions existing from N previous scenes to a current scene (N>1), including extracting MaxRGB information (where MaxRGB represents the maximum value among Red, Green, and Blue pixels) as spatial information of each frame and storing a temporal minimum and a temporal maximum of the MaxRGB information to multiple buffers of each scene. Some embodiments include accurate translucent logo detection: extracting a minimum and a maximum of MaxRGB pixel values from each frame in a scene as temporal feature maps for representing pixel variance over time, and applying segmentation and block matching on the extracted minimum and maximum temporal feature maps to detect a stationary region type (e.g., translucent logos).

FIG. 1 illustrates an example of OLED display 100 burn-in. OLED displays have been widely used in many multimedia devices such as TV and smart phones because it has shown better image contrast and lower power consumption than LCD displays. The OLED burn-in, which refers to a non-uniform deterioration pixel region and looks like ghosting. As shown, the example burn-in locations 110 and 120 on the OLED display 100 appear as remnants or ghost images. Since the burn-in not only rapidly reduces the lifetime of OLED panels but also causes image quality degradation, it can be a critical problem that needs to be solved. Therefore, detecting the bright stationary pixels such as a logo(s) becomes a very important processing step so that luminance reduction can further be applied on the stationary region to slow down burn-in.

Figure 2B:
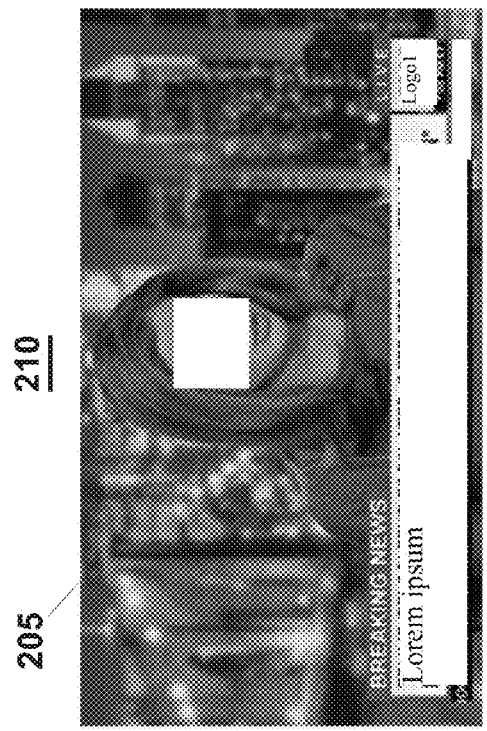
FIGS. 2A-B illustrate an example of a displayed large stationary background.
Figure 2A:
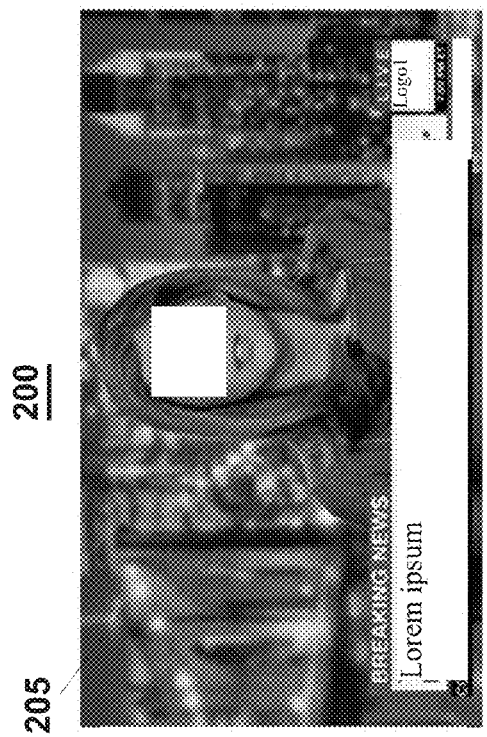

FIGS. 2A-B illustrate an example of a displayed large stationary background 205. As the video on screenshot 200 transitions to screenshot 210, the background 205 remains the same while other elements of the video stream change. In some cases, there can be three important problems in stationary region detection. One is the definition of a stationary region that would not affect image quality to users. Since the luminance on the detected stationary regions is reduced to slow down burn-in, the detected stationary region should not be too large. For example, as shown in FIGS. 2A-B, the large background 205 of a video can also be stationary for a long time as well as the logos being stationary. If the large background 205 is detected and the luminance on the region is reduced, TV users will notice the image quality degradation. In this case, the detection algorithm should only detect logos. By only checking the pixel intensity variation during certain time interval(s), logos may not be distinguishable from the stationary background. Also, the logos may not be distinguishable from the stationary background using only the size of the stationary region. That is because the size of a logo can be larger than that of the stationary background. Therefore, in some embodiments there should be a clear definition of a stationary region to be detected so that logos can only be detected when there is a stationary background.

Figure 3:
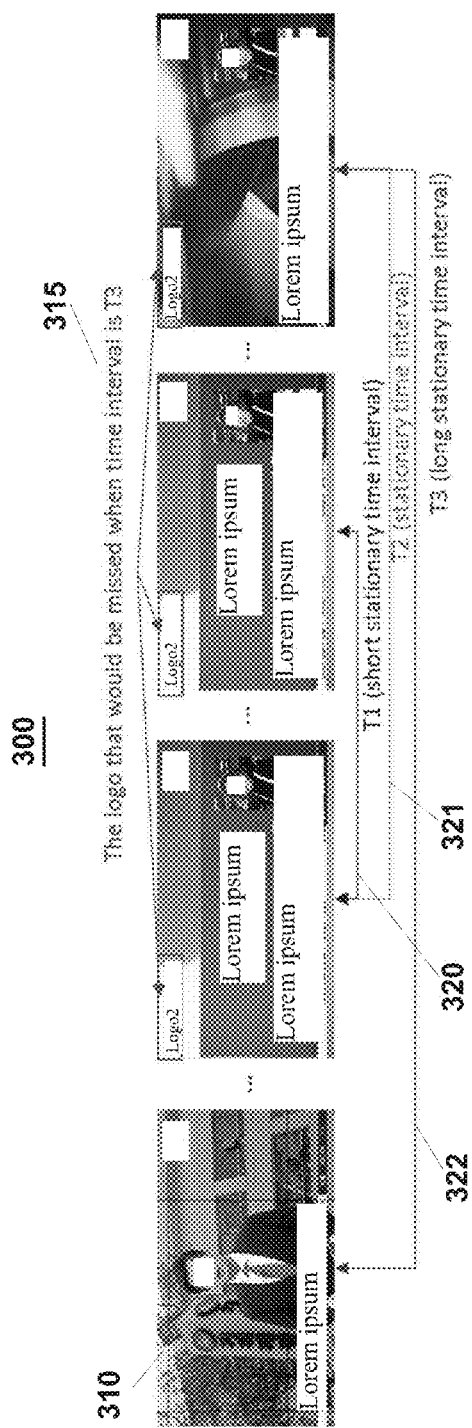
FIG. 3 illustrates an example of different stationary regions by different detection time intervals.

FIG. 3 illustrates an example 300 of different stationary regions by different detection time intervals (T1 320, T2 321 and T3 322). In some embodiments, there may be a need to define the stationary time interval. Depending on the stationary time interval for detection, the stationary region to be detected may be different. For example, if the stationary time interval is short (T1 320), there can be small changes of pixel intensity over several frames 310. And the large image area may be detected as a stationary region (the case of T1 320 shows an example). If the time interval is long (T3 322), some logos that appear or disappear in the intermediate frame would be missed. The image quality degradation would be noticed by TV users in case of T1 320, and burn-in could be happen in the missing detection region 315. Therefore, there is a need to have the obvious stationary time interval that resolves these problems.

Figure 4:
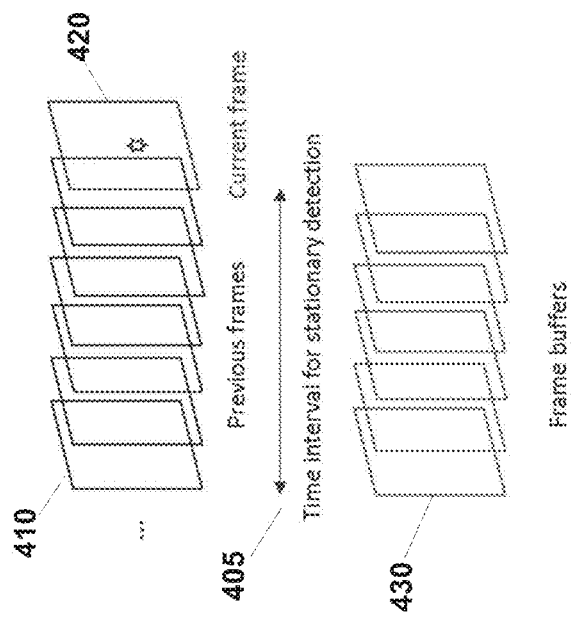
FIG. 4 illustrates an example of frame buffers necessary for past temporal pixel intensity variation, according to some embodiments.

FIG. 4 illustrates an example of frame buffers 430 necessary for past temporal pixel intensity variation, according to some embodiments. In some embodiments, since the processing system may be implemented in hardware and operated in real time, a cost-efficient system design would be advantageous. To compute the past temporal intensity variation of a pixel in the current frame 420, several frame buffers 430 that store previous frames 410 may be needed. If the time interval 405 becomes longer, the more frame buffers 430 may be necessary. This increases hardware needed, and therefore increases cost. Therefore, a cost-efficient system design would be advantageous.

Figure 5:
FIG. 5 illustrates an example of a translucent logo on a display.

FIG. 5 illustrates an example of a translucent logo 510 on a display 500. In some cases, the best example of stationary regions in the video is a logo(s). The logo can be split into two types: 1) opaque logos and 2) translucent logos (e.g., translucent logo 510). A translucent logo is generally generated by blending an opaque logo with background pixels. If the intensities of background pixels vary over time, the temporal pixel intensity variation of the translucent logo becomes large. As a result, distinguishing translucent logos from the background can be a difficult problem in detection.

Figure 6:
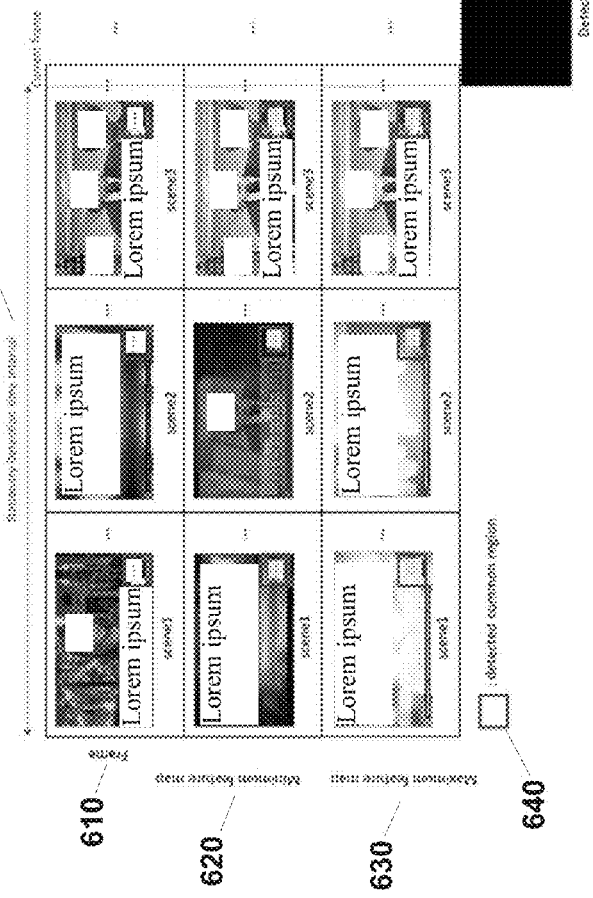
FIG. 6 illustrates an example scenario showing detected common regions and a detection map for different displayed video frames, according to some embodiments.

FIG. 6 illustrates an example scenario 600 showing detected common regions 640 and a detection map 650 (with detected common region 645) for different displayed video frames 610, according to some embodiments. In some embodiments, the stationary detection problem is defined as detecting the common objects on continuous multiple scenes (at least 2). Since different scenes have different backgrounds including a stationary background while it keeps the same stationary region (such as logos that cause burn-in), this stationary region is distinguishable from a stationary background. This helps the system by not detecting a large stationary background. In one or more embodiments, the detection time interval is defined based on the time interval of each scene. Therefore, the stationary detection time interval 605 is adaptively adjusted depending on the video content. This assists in determining a proper stationary time interval. A video is split into several scenes using scene change detection, and the common region between multiple scenes is detected using image matching. In some embodiments, the disclosed technology parses a whole video into multiple scenes and stores the minimum and maximum values of every pixel of the previous N scenes and the current scene into frame buffers (N+1 minimum and maximum frame buffers). The disclosed technology applies image matchings among these frame buffers and current frame to detection stationary region from N previous scene to current frame (note: the current scene is the scene that includes current processing frame). As will be described below, the detection map 650 uses the maximum feature map (MaxRGB) 630 and the minimum feature map 620 (MaxRGB) to generate the detection map 650. The example scenario 600 shows that the disclosed technology can detect the logo even in a video with a stationary background.

Figure 7:
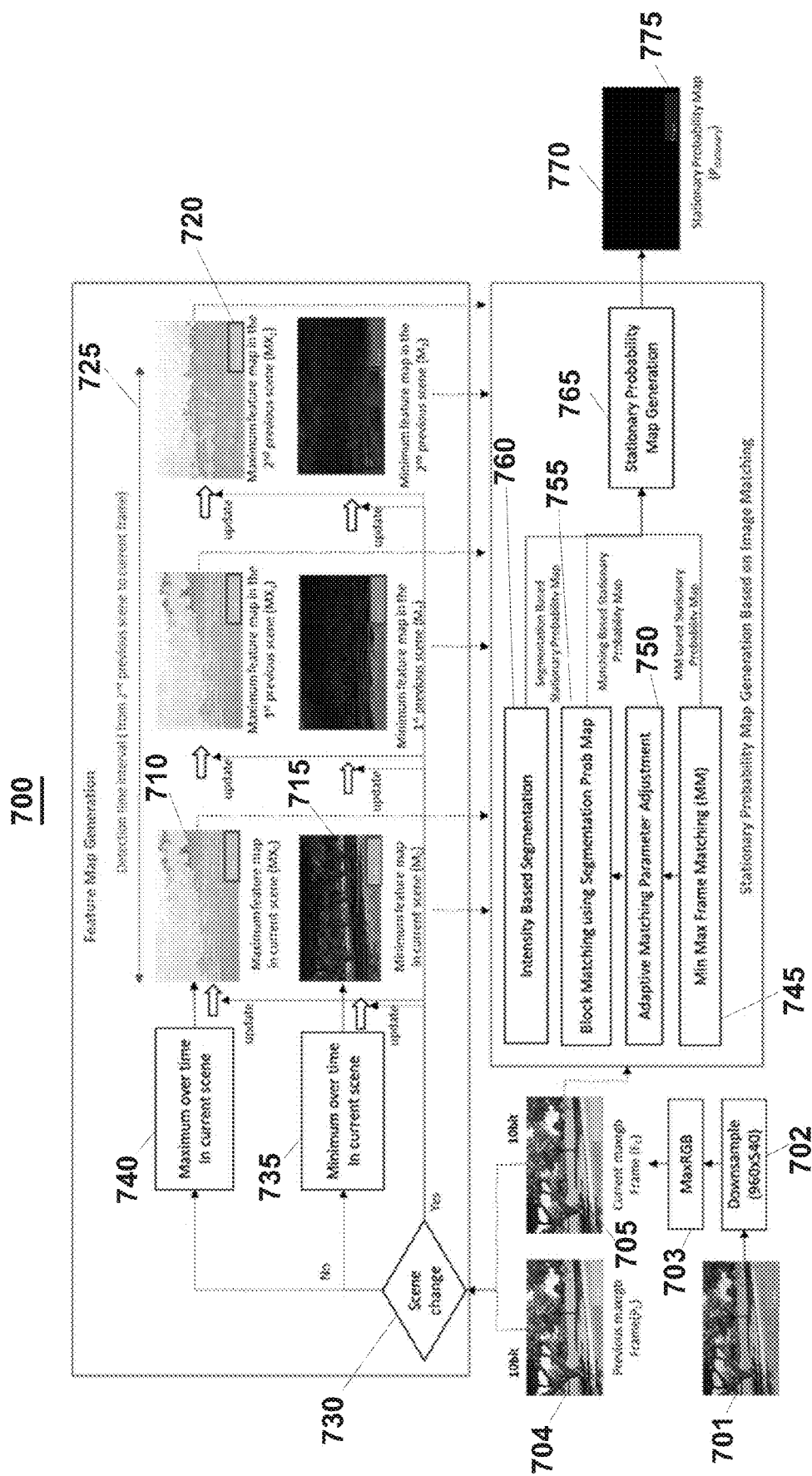
FIG. 7 illustrates an example system diagram associated with the disclosed technology for slowing OLED burn-in, according to some embodiments.

FIG. 7 illustrates an example system 700 diagram associated with the disclosed technology for slowing OLED burn-in, according to some embodiments. In system 700, one scene (e.g., scene 701) is represented with two frame buffers such as a minimum feature map 715 and a maximum feature map 710. Note that the minimum feature map 715 has minimum MaxRGB of each pixel while the maximum feature map 710 has the maximum MaxRGB of each pixel over the time in one scene. In system 700, the minimum and maximum MaxRGB of each pixel for two previous scenes and one current scene are stored as $MX_{2,1,C}$ and $M_{2,1,C}$. Using these feature maps, system 700 detects any stationary region (e.g., stationary region 720) on a current frame in real time using segmentation and image matching among them. Since these feature maps are updated every scene change, system 700 detects the common stationary regions from two previous scenes to a current frame (the current frame continues to change) in real time.

In some embodiments, the input scenes 701 are input to a downsample process 702 (e.g., 960×540) and then proceeds to a MaxRGB 703 processing that results with a current MaxRGB frame ($F_c$) 705 (e.g., 10 bit) and a previous MaxRGB frame ($P_c$) 704 (e.g., 10 bit). $F_c$ 705 is input to a processing block for stationary probability map generation based on image matching. In block 730 the system 700 detects whether there is a scene change or not. If a scene change is detected processing proceeds to provide an update for a maximum feature map in a $2^{nd}$ previous scene ($MX_2$) and a minimum feature map in a $2^{nd}$ previous scene ($M_2$), and these updates are input to the processing block for stationary probability map generation based on image matching. If no scene change is detected, system 700 proceeds to block 735 to determine a minimum feature map over time in the current scene, and to block 740 for determining a maximum feature map over time in the current scene.

In one or more embodiments, the processing block for stationary probability map generation based on image matching includes a Min Max Frame Matching (MM) process 745 (which outputs an MM based stationary probability map), an Adaptive Matching Parameter Adjustment process 750, a Block Matching using Segmentation Probability Map process 755 (which takes as input the output from the Adaptive Matching Parameter Adjustment process 750 and outputs a matching based stationary probability map), an Intensity Based Segmentation process 760 (which outputs a segmentation based stationary probability map), and a Stationary Probability Map Generation process 765 (which takes as input the results/output from the MM process 745, the Block Matching using Segmentation Probability Map process 755 and the Intensity Based Segmentation process 760) that generates/outputs a Stationary Probability Map ($P_{stationary}$) 770 with a detected common region 775.

In some embodiments, since common objects are detected from previous N scenes to a current scene, the stationary detection time interval 725 is changed adaptively depending on video content while other approaches use a fixed value for this. In one or more embodiments, this assists the disclosed technology to not result in false detections on static background videos (e.g., news programming) because different scenes generally have different backgrounds. Also, the disclosed technology can even detect the stationary region that only exists during a short time interval if the video has several fast scene changes.

In some embodiments, the system 700 has a hardware friendly and low cost design since a small number of frame buffers (2× (N+1)) are used to detect stationary regions 720 from N previous scenes to current scene (N=1 or 2). The design of the disclosed technology can be less expensive than some other approaches that keep very long previous frames such as 300 frames. Additionally, the frame buffers of the disclosed technology can store minimum and maximum values of pixels of small resolution images to reduce the cost of frame buffers.

In one or more embodiments, system 700 provides real time processing as the minimum and maximum frame buffers are kept updated whenever a scene change occurs. The disclosed technology can keep tracking the stationarity of every pixel from N previous scenes to current frame in real time.

In some embodiments, system 700 uses minimum and maximum frames and performs segmentation and image matching using these frames. The disclosed technology accurately detects translucent logos because the shapes of bright translucent logos are well maintained in the minimum frames while non-stationary regions become dark. Similarly, the non-bright logos are well maintained in the maximum frames. This helps to segment and perform image matching on the translucent logos more accurately.

In some cases, the stationary detection problem is defined as detecting the common objects on continuous multiple scenes (e.g., at least 2). Since different scenes have different backgrounds including a stationary background while it keeps the same stationary region such as logos that cause burn-in, in some embodiments system 700 distinguishes this stationary region from a stationary background. This helps avoid detecting a large stationary background. Additionally, the detection time interval 725 can be defined based on the time interval of each scene. Therefore, the stationary detection time interval 725 can be adaptively adjusted depending on the video content. This assists in determining a proper stationary time interval. In one or more embodiments, system 700 splits a video into several scenes using scene change detection 730; and the disclosed technology detects the common region between multiple scenes using image matching.

In some embodiments, system 700 represents one scene with two frame buffers such as a minimum frame and a maximum frame. Note that the minimum frame has minimum intensity of each pixel while the maximum frame has the maximum intensity of each pixel over the time in one scene.

Figure 8:
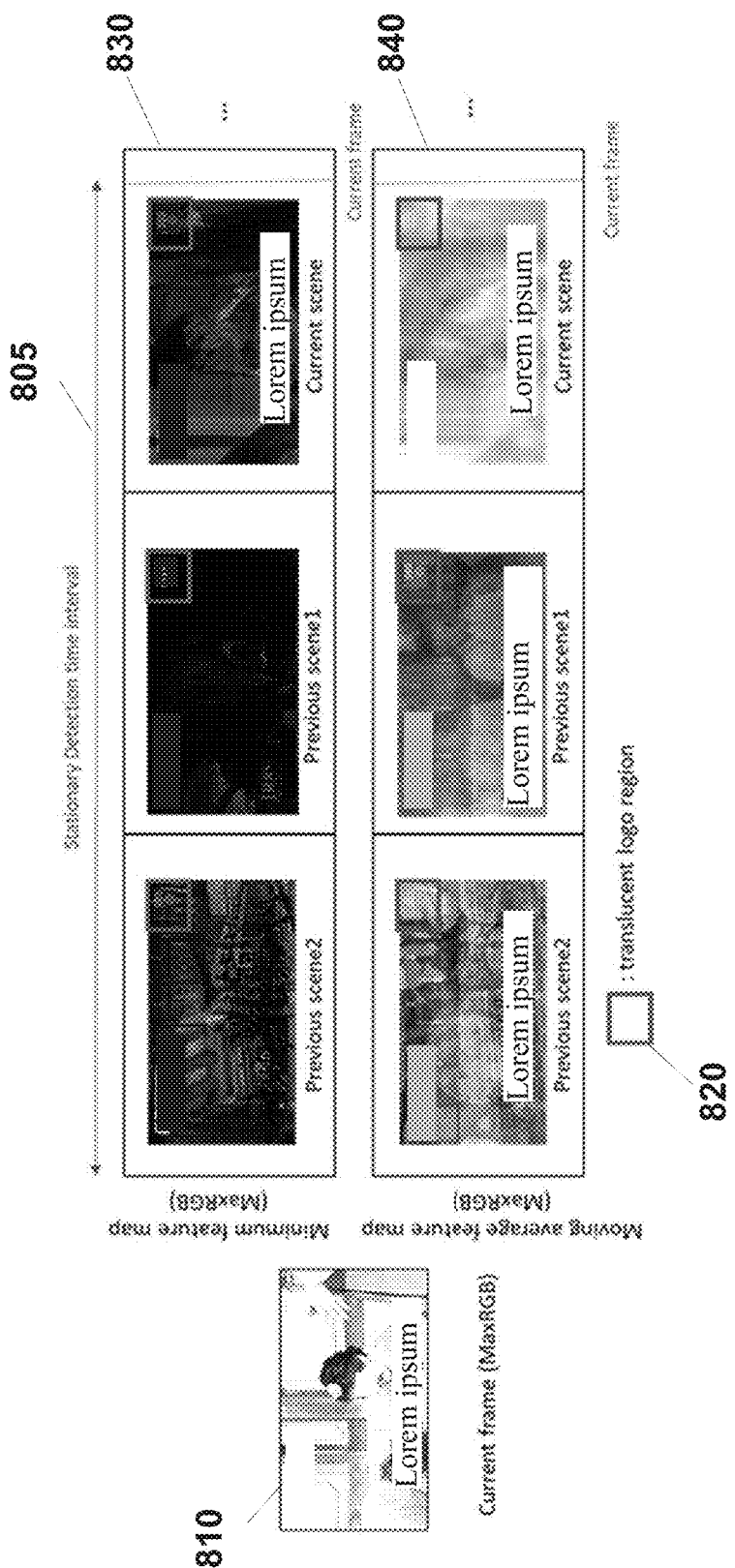
FIG. 8 illustrates an example of a high intensity translucent logo in a minimum frame for previous and current scenes versus a moving average frame for previous and current scenes, according to some embodiments.

FIG. 8 illustrates an example of a high intensity translucent logo 820 in a minimum frame for previous and current scenes versus a moving average frame for previous and current scenes, according to some embodiments. The current frame (MaxRGB) 810 is provided for generating a Moving Average feature map (MaxRGB) 840 for a current scene and two previous scenes (along a stationary detection time interval 805) and also for generating a minimum feature map (MaxRGB) 830 for the current scene and the two previous scenes (along the stationary detection time interval 805). Translucent logos have been hard to detect via traditional approaches, which mostly use temporal variance for detecting stationary regions. That is because the translucent logo also has a relatively large variance such as a non-stationary region. In some embodiments, the minimum and maximum frame with intensity robust or invariant image matching helps to resolve detection of translucent logos. Since a bright stationary region has high pixel intensities in the minimum frame while non-stationary regions have low intensities, the shapes of bright translucent logos are well maintained in the minimum frames while non-stationary regions become dark region without any shape. Similarly, as shown in the example of FIG. 8, the dark stationary region maintains the shape of dark translucent logos in the maximum frame while other regions do not. Note that some conventional approaches use a moving average frame to find a bright stationary region by using a threshold. A bright translucent logo, however, is difficult to be discriminated from the background in a moving average frame while a minimum frame can easily differentiate the logos from other background. In actuality, a translucent logo's shape is well maintained in each minimum frame, but the intensities of the logo would vary among the minimum frames. Therefore, in some embodiments, the disclosed technology uses two block matching methods that utilize the shape of the logos. One method makes the matching robust to intensity change using intensity adaptive thresholding and the other method uses an intensity invariant matching metric (normalized cross correlation). Using both methods, the disclosed technology detects translucent logos more accurately than conventional techniques.

Figures 9, 10:
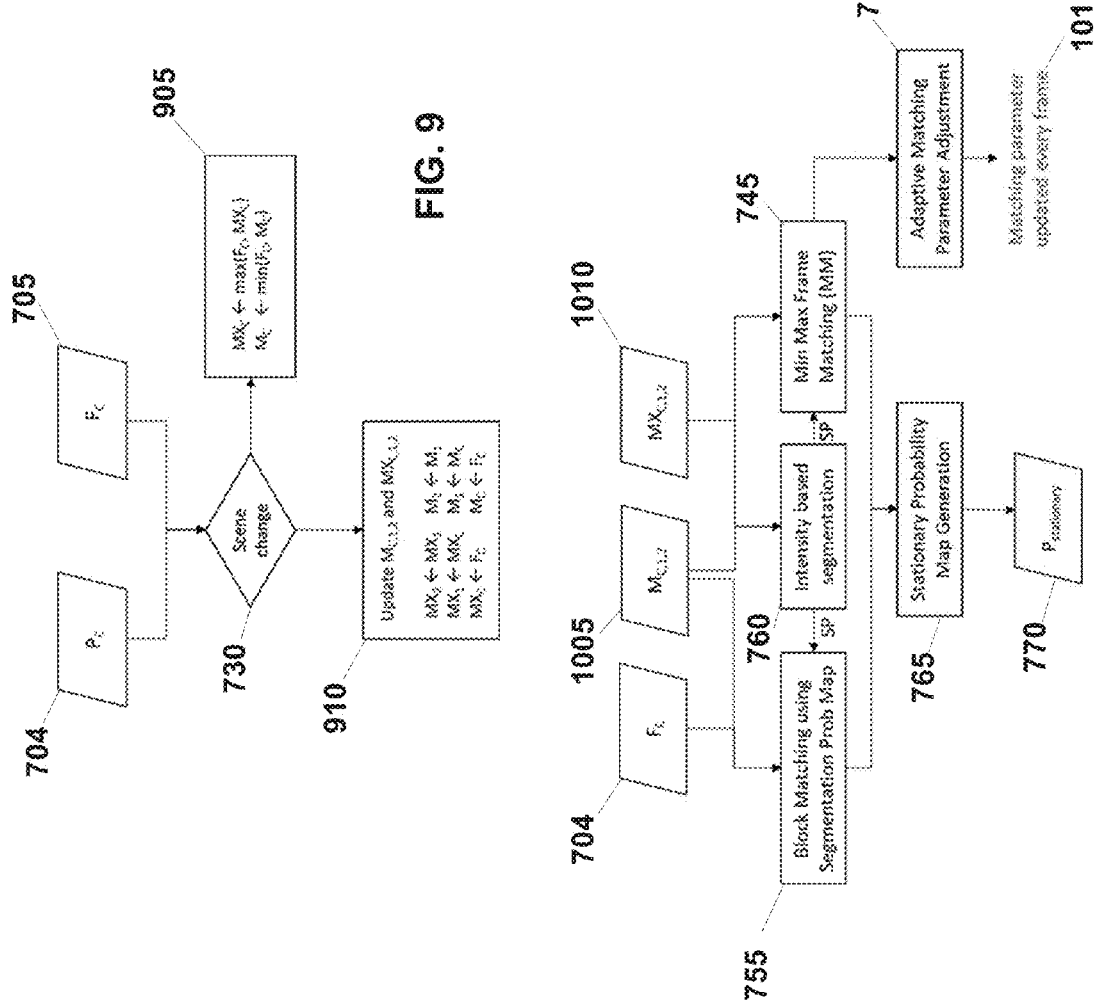
FIG. 9 illustrates an example flowchart of frame buffer processing, according to some embodiments.
FIG. 10 illustrates an example flowchart of stationary probability map generation based on image matching, according to some embodiments.

FIG. 9 illustrates an example flowchart of frame buffer processing, according to some embodiments. In some embodiments, system 700 (FIG. 7) includes two blocks (i.e., modules, components, parts, etc.), that may be referred to as "Frame buffers processing" and "Stationary probability map generation based on image matching." The "Frame buffers processing" block takes a role of updating minimum and maximum frame buffers based on scene change in block 730 detection results. In one or more embodiments, there may be, for example, seven frame buffers: three buffers for the minimum frames ($M_C$, $M_1$, $M_2$), three buffers for the maximum frames ($MX_C$, $MX_1$, $MX_2$), and one buffer for previous frame. The disclosed technology may determine a MaxRGB value for the current RGB frame. The MaxRGB value for the current frame ($F_c$ 705) is compared with the MaxRGB value for the previous frame ($P_c$ 704) to check if there is any scene change in block 730. If there is no scene change, the disclosed technology updates $M_C$ and $MX_C$ in block 905 as follows:

$$M_c(x,y)=\mathrm{MIN}(M_c(x,y),F_c(x,y))$$

$$MX_c(x,y)=\mathrm{MAX}(MX_c(x,y),F_c(x,y))$$

where (x, y) is the coordinate of a pixel. Note that only $M_c$ and $MX_c$ are updated during this process. If there is scene change determined in block 730, the disclosed technology can update the frame buffers in block 910 as follows:

$$M_2(x,y)=M_1(x,y)$$

$$M_1(x,y)=M_c(x,y)$$

$$M_c(x,y)=F_c(x,y)$$

$$MX_2(x,y)=MX_1(x,y)$$

$$MX_1(x,y)=MX_c(x,y)$$

$$MX_c(x,y)=F_c(x,y)$$

FIG. 10 illustrates an example flowchart of stationary probability map generation based on image matching, according to some embodiments. In some embodiments, the "Stationary probability map generation based on image matching" block takes the updated frame buffers ($M_{C,1,2}$ 1005 and $MX_{C,1,2}$ 1010) and uses them with current MaxRGB frame $F_C$ 704 to generate stationary probability map ($P_{stationary}$ 770 (FIG. 7)) using image matching. In block 755, system 700 (FIG. 7) performs block matching using a segmentation probability map. In block 760 system 700 performs intensity based segmentation. In block 745 system 700 performs minimum and maximum frame matching (MM). Block 765 performs stationary probability map generation. In block 750, system 700 performs adaptive matching parameter adjustment that provides a matching parameter updated every frame 1015.

$$L1 \text{ distance}: d_{ck}(x, y) = \sum_i \sum_j |F_c(x+i, y+j) - M_k(x+i, y+j)|_1 \times SP_N(x+i, y+j)$$

$SP_N$: Normalized Segmentation Probability Map

Where $k \in \{c, 1, 2\}$ $$SP_N(x, y) = \frac{SP(x+i, y+i)}{\sum_i \sum_j SP(x+i, y+i)}.$$

$(i, j) \in W_{(x,y)}$: Window on $(x, y)$

Figure 11:
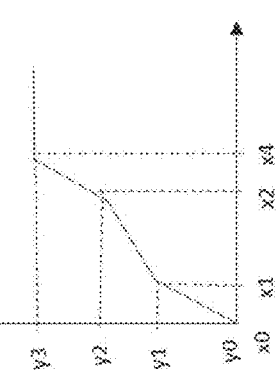
FIG. 11 illustrates a graph used for a stationary map for a four point look up table (LUT) used for generating a stationary probability (SP) map, according to some embodiments.

FIG. 11 illustrates a graph 1100 used for a stationary map for a four point look up table (LUT) that is used for generating a stationary probability (SP) map, according to some embodiments. In one or more embodiments, once $M_C$, $M_1$, $M_2$, $MX_C$, $MX_1$, and $MX_2$ are all updated, the disclosed technology starts to detect the common logos that exist on three scenes. Intensity based segmentation is performed to generate a segmentation based SP map. Using a "soft" threshold on pixel intensities in minimum frames and maximum frames, the disclosed technology generates the SP as follows:

$SP(x,y) = \text{MAX}(SP_M(x,y), SP_{MX}(x,y))$ where $SP_M(x,y) = \text{Prob}_4(\text{Min}(M_c(x,y), M_1(x,y), M_2(x,y)))$ $SP_{MX}(x,y) = \text{Prob}_4(\text{Max}(MX(x,y), MX_1(x,y), MX_2(x,y))$ Prob4(x): 4 pt Look up table (LUT).

Figure 12:
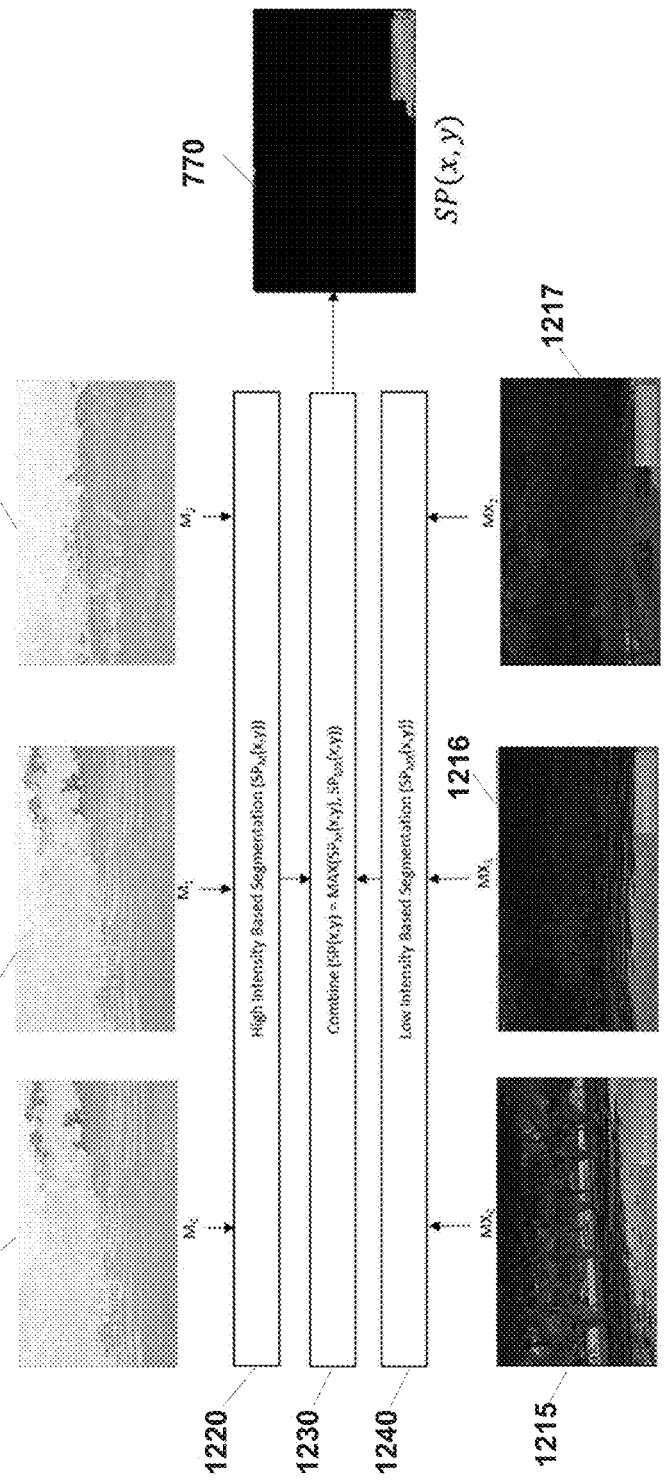
FIG. 12 illustrates an example diagram for intensity based segmentation, according to some embodiments.

FIG. 12 illustrates an example diagram for intensity based segmentation (block 760, FIGS. 7 and 10), according to some embodiments. As shown, $M_C$ 1205, $M_1$ 1206 and $M_2$ 1207 are input to block 1220 for high intensity based segmentation ($SP_M(x,y)$). $MX_C$ 1215, $MX_1$ 1216 and $MX_2$ 1217 are input to block 1240 for low intensity based segmentation ($SP_{MX}(x,y)$). The results from blocks 1220 and 1240 are input to block 1230 for combining processing: Combine ($SP(x,y) = \text{MAX}(SP_M(x,y), SP_{MX}(x,y))$, which results in the $SP(x,y)$ 770.

Figure 13:
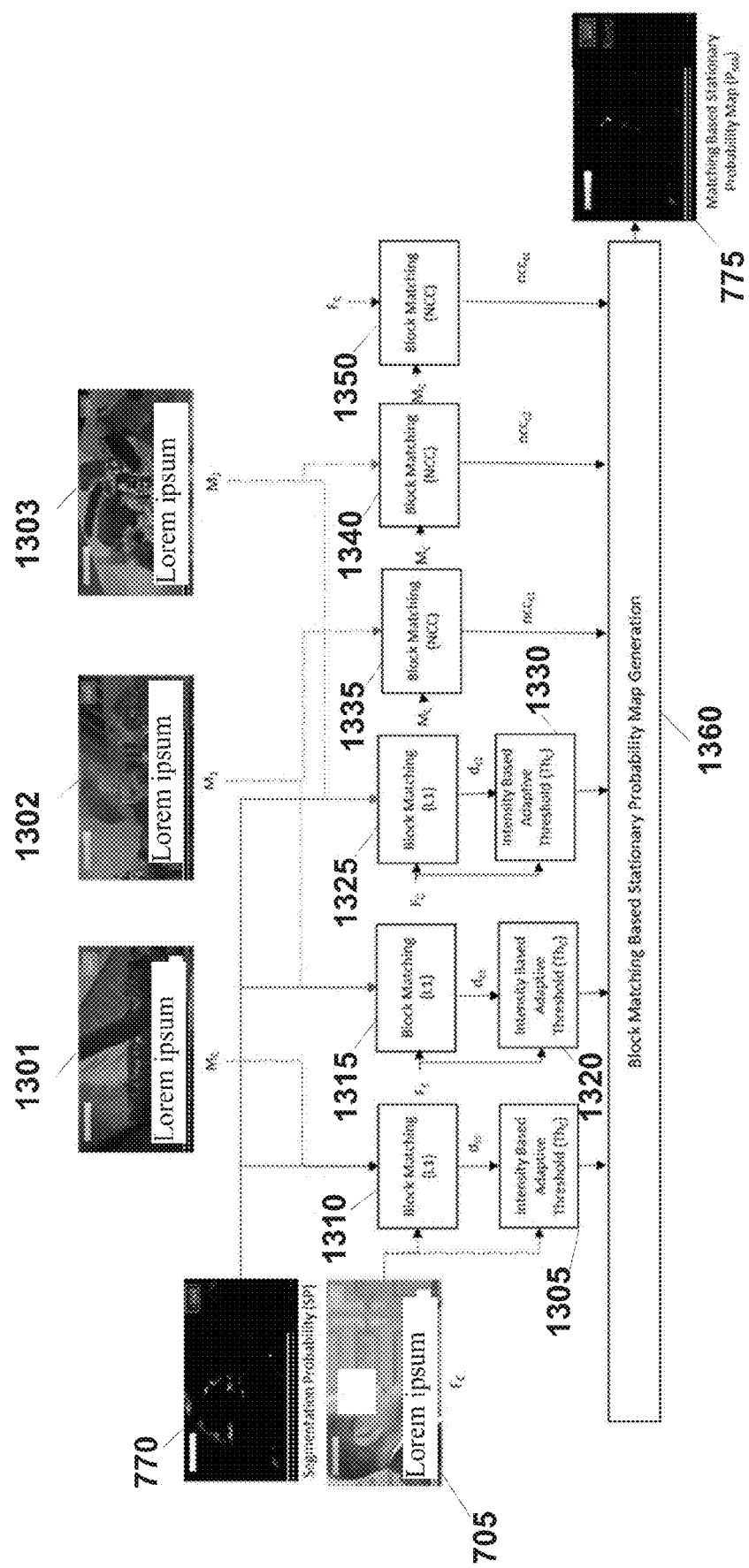
FIG. 13 illustrates a diagram for block matching using SP map generation, according to some embodiments.

FIG. 13 illustrates a diagram for block matching using SP map generation, according to some embodiments. In one or more embodiments, if there is false detection from segmentation, it may be refined using block matching (5×5 kernel). Using block matching between $F_C$ 705 and $M_{C,1,2}$ ($M_C$ 1301, $M_1$ 1302, $M_2$ 1303) the disclosed technology generates the stationary probability map ($P_{MA}$) 775. In some cases, there may be issues in block matching using a pixel intensity difference: 1) an incorrect block matching result around a boundary of a stationary region due to background pixels; and 2) incorrect block matching results due to a variation of intensity in a stationary region (e.g., a translucent logo). In some embodiments, a solution for the first issue is to use block matching with a segmentation probability map 770, where the disclosed technology ignores background pixels. In one or more embodiments, a solution for the second issue is by combining block matching (using Block Matching (L1 distance) in blocks 1310, 1315 and 1325, and Block Matching (Normalized Cross Correlation (NCC)) in blocks 1335, 1340 and 1350) with intensity adaptive thresholding (using Intensity Based Adaptive Threshold ($Th_C$) processing in blocks 1305, 1320 and 1330) for Block Matching Stationary Probability Map Generation in block 1360, the disclosed technology can make block matching (e.g., L1 distance) robust to the intensity variation of stationary region using the following:

Additionally, one or more embodiments uses the NCC metric, which is invariant to intensity change, and which makes the block matching more robust Normalized cross correlation: $ncc_{ck}(x, y) =$ $$\sum_i \sum_j \frac{(M_c(x+i, y+j) - \text{mean } (M_c)) \times (M_k(x+i, y+j) - \text{mean } (M_k))}{std(M_c) \times std(M_k)} k \in$$

$\{1, 2\}$.

It should be noted that NCC makes a false detection on a noisy planar region. Therefore, the disclosed technology can use both L1 and NCC metrics for more accurate matching results. It should also be noted that in one or more embodiments the L1 Block Matching is only performed with the segmentation probability map, and that a high intensity pixel has a higher threshold in intensity based adaptive thresholding processing.

Figure 14A:
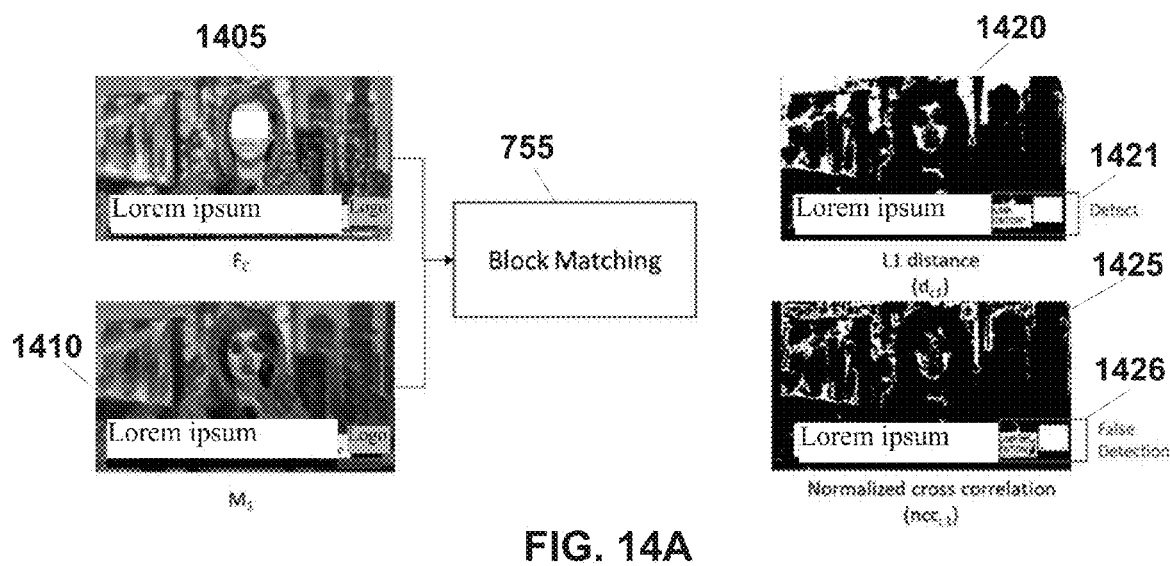
FIGS. 14A-B illustrate examples of false detection on planar regions with noise using normalized cross correlation.
Figure 14B:
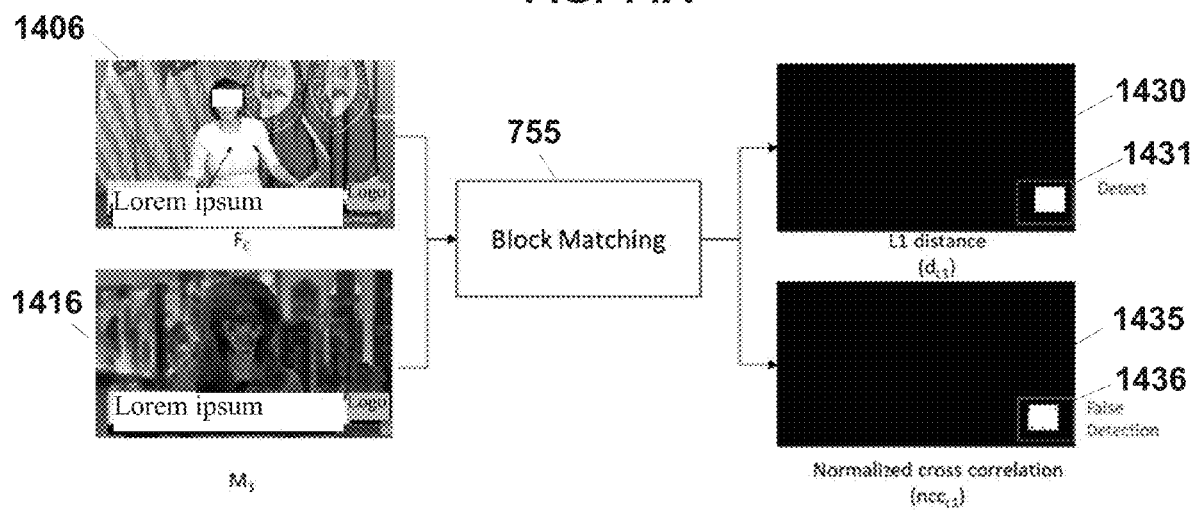

In some embodiments, the stationary probability map, $P_{MA}$, is determined/computed as follows:

$P_{MA}(x,y) = (P_{L1}(x,y), P_{NCC}(x,y))$ where:

$P_{L1}(x,y) = P_{L1-Fc}(x,y) \cdot P_{L1-F1}(x,y) \cdot P_{L1-F2}(x,y)$ $P_{L1-Fc}(x,y) = \text{Prob}_4^{L1}(d_{Fc}(x,y) - Th_F(x,y)) \cdot SP(x,y)$ $P_{L1-F1}(x,y) = \text{Prob}_4^{L1}(d_{F1}(x,y) - Th_F(x,y)) \cdot SP(x,y)$ $P_{L1-F2}(x,y) = \text{Prob}_4^{L1}(d_{F2}(x,y) - Th_F(x,y)) \cdot SP(x,y)$ $Th_F(x,y) = \text{Prob}_2^{th-F}(F_c(x,y))$ $P_{NCC}(x,y) = \text{MIN}(P_{NCC-F1}(x,y), P_{NCC-F2}(x,y)) \cdot P_{NCC-Fc}(x,y) \cdot SP(x,y)$ $P_{NCC-Fc}(x,y) = \text{Prob}_4^{NCC}(ncc_{Fc}(x,y))$ $P_{NCC-F1}(x,y) = \text{Prob}_4^{NCC}(ncc_{F1}(x,y))$ $P_{NCC-F2}(x,y) = \text{Prob}_4^{NCC}(ncc_{F2}(x,y))$ FIGS. 14A-B illustrate examples of false detection on planar regions with noise using normalized cross correlation. In FIG. 14A, $F_C$ 1405 and $M_1$ 1410 are input to block matching processing 755. The L1 distance ($d_{c1}$) 1420 image shows the detection of the logo 1421. The NCC ($NCC_{c1}$)

1425 image shows false detection of the logo 1426. In FIG. 14B, $F_C$ 1406 and $M_1$ 1416 are input to block matching processing 755. The L1 distance ($d_{c1}$) 1430 image shows the detection of the logo 1431. The NCC 1 ($NCC_{c1}$) 1435 image shows false detection of the logo 1436.

FIGS. 15A-B illustrate examples of the benefit of using both block matching (L1) and NCC, according to some embodiments. In FIG. 15A, the input scene images include Fc 1505, $M_C$ 1515, $M_1$ 1520 and $M_2$ 1525. The result of using block matching for L1 distance is shown in image 1530 where there is false detection around the edge. The result of using NCC is shown in image 1535 where there is false detection on a planar region. The result of using block matching for L1 distance combined with NCC is shown in image 1540 where there is correct detection. In FIG. 15B, the input scene images include $F_C$ 1506, $M_C$ 1516, $M_1$ 1521 and $M_2$ 1526. The result of using block matching for L1 distance is shown in image 1531 where there is false detection around the edge. The result of using NCC is shown in image 1536 where there is correct detection. The result of using block matching for L1 distance combined with NCC is shown in image 1541 where there is correct detection.

Figure 16:
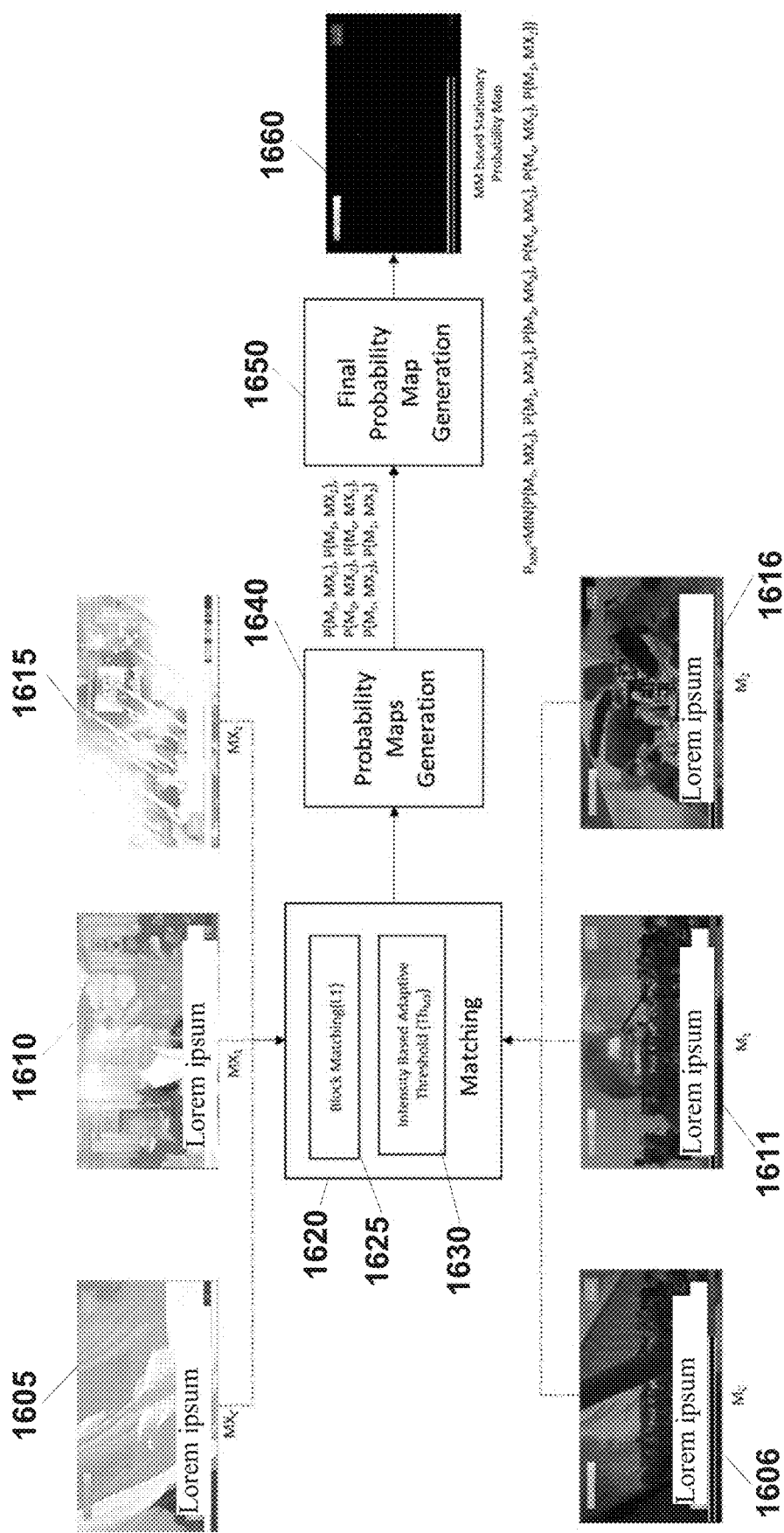
FIG. 16 illustrates an example block diagram of block matching (L1) using a segmentation probability map, according to some embodiments.

FIG. 16 illustrates an example block diagram of block matching (L1) using a segmentation probability map, according to some embodiments. The input scene images include $MX_C$ 1605, $MX_1$ 1610, $MX_2$ 1615, $M_C$ 1606, $M_1$ 1611, $M_2$ 1616. In block 1620, processing for block matching (L1) 1625 and intensity based adaptive threshold ($TH_{MX}$) processing 1630 receives the input. Block 1640 provides processing for probability maps generation. The output of block 1640 is input to block 1650 for final probability map generation processing. The result is the MM based stationary probability map ($P_{MM}$) 1660. In some embodiments, the MM frame block matching uses the same block matching of the "block matching using segmentation probability map" (block 755, FIG. 7) using $M_{C,1,2}$ and $MX_{C,1,2}$ ($M_C$ 1606, $M_1$ 1611, $M_2$ 1616 and $MX_C$ 1605, $MX_1$ 1610, $MX_2$ 1615; Fc is not used here). Block 1620 only uses an L1 metric (not a NCC metric) for block matching (block matching 1625). In some embodiments, the $P_{MM}$ is generated as follows:

$$P_{MM} = \text{MIN}(P_{MM\_CC}, P_{MM\_11}, P_{MM\_22}, P_{MM\_C1}, P_{MM\_C2}, P_{MM\_12})$$

where:

$$P_{MM\text{-}cc}(x,y) = \text{Prob}_4^{MM\text{-}L1}(d_{cc}(x,y) - Th_{MXc}(x,y)) \cdot SP(x,y)$$

$$P_{MM\text{-}11}(x,y) = \text{Prob}_4^{MM\text{-}L1}(d_{11}(x,y) - Th_{MX1}(x,y)) \cdot SP(x,y)$$

$$P_{MM\text{-}22}(x,y) = \text{Prob}_4^{MM\text{-}L1}(d_{22}(x,y) - Th_{MX2}(x,y)) \cdot SP(x,y)$$

$$Th_{MX_k}(x,y) = \text{Prob}_4^{th\text{-}MX_k}(F_c(x,y))$$

$$P_{MM\text{-}c1}(x,y) = \text{Prob}_4^{MM\text{-}L1}(d_{c1}(x,y) - Th_{MX1}(x,y)) \cdot SP(x,y)$$

$$P_{MM\text{-}c2}(x,y) = \text{Prob}_4^{MM\text{-}L1}(d_{c2}(x,y) - Th_{MX2}(x,y)) \cdot SP(x,y)$$

$$P_{MM\text{-}12}(x,y) = \text{Prob}_4^{MM\text{-}L1}(d_{12}(x,y) - Th_{MX2}(x,y)) \cdot SP(x,y)$$

In some embodiments, when a logo disappears, the disclosed technology detects the disappearance globally (per one frame) better than locally (such as block matching) because of a small window size. Using this observation, the disclosed technology adaptively adjusts block matching parameters of a current frame to prevent ghost artifacts. The disclosed technology can use a NCC metric ($Ncc_{global}$) to globally detect the disappearance event as follows:

$$Ncc_{global} = \sum_{i,j \in P_{MM}(x,y) > 0.5} \frac{(M_c(x+i, y+j) - \text{mean}(M_c)) \times (M_{ave}(x+i, y+j) - \text{mean}(M_{ave}))}{std(M_c) \times std(M_{ave})}$$

Where $M_{ave} = (M_C + M_1 + M_2)/3$.

It should be noted that the NCC global metric is computed on the pixel whose $P_{MM}(x,y)$ is greater than 0.5. To make sure there is no frame delay, the disclosed technology may compute mean($M_C$) and mean ($M_{ave}$) from a previous frame. Some embodiments use $Ncc_{global}$ to update block matching parameters of the next frame. In one or more embodiments, the final stationary probability map is generated using multiplication of $P_{MA}$ and $P_{MM}$ as follows:

$$P_{Stationary}(x,y) = P_{MA}(x,y) \cdot P_{MM}(x,y).$$

Figure 17B:
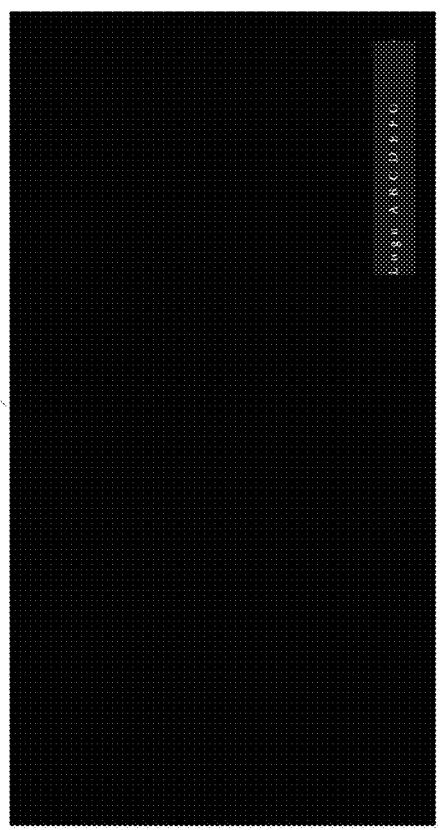
FIGS. 17A-B illustrate an example OLED display with a logo and resulting SP map, according to some embodiments.
Figure 18B:
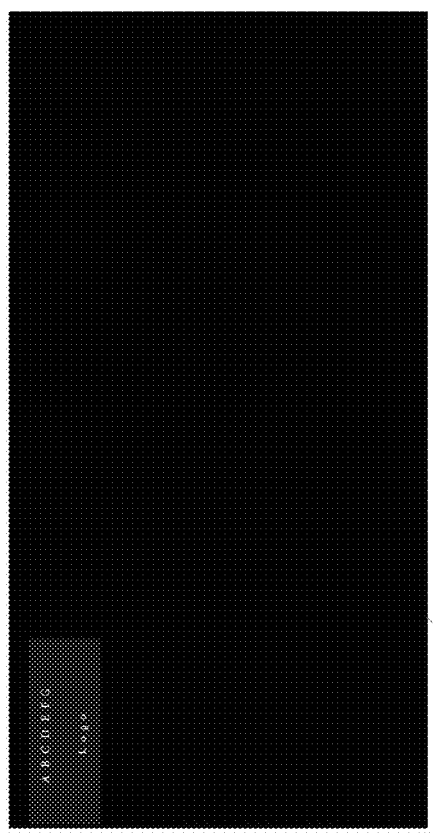
FIGS. 18A-B illustrate another example OLED display with a logo and resulting SP map, according to some embodiments.
Figure 17A:
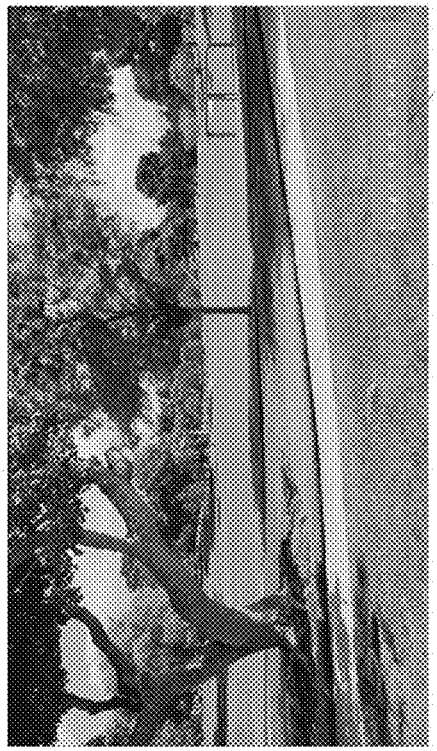
Figure 18A:
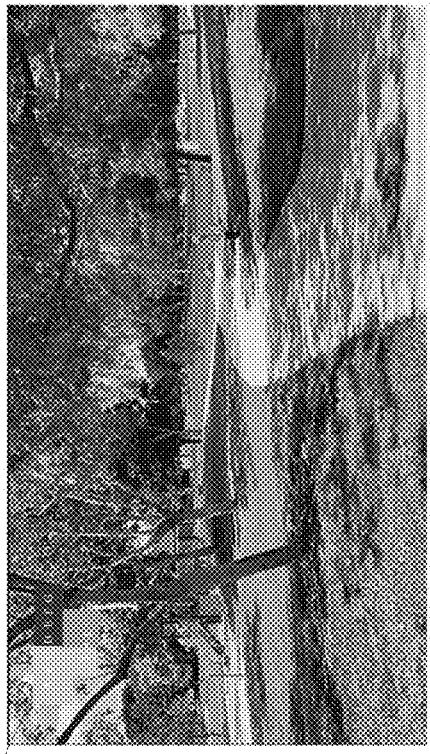

FIGS. 17A-B illustrate an example OLED display 1705 with a logo 1706 and resulting SP map 1710, according to some embodiments. FIGS. 18A-B illustrate another example OLED display 1806 with a logo 1805 and resulting SP map 1810, according to some embodiments. In some embodiments, the disclosed technology provides a stationary detection map to luminance reduction circuitry or processing. Then the luminance reduction circuitry or processing utilizes the detection map so that it can determine where it should reduce the luminance and how much to reduce. The disclosed technology may be used for OLED-display applications to reduce the burn-in problem of OLED.

Figure 19:
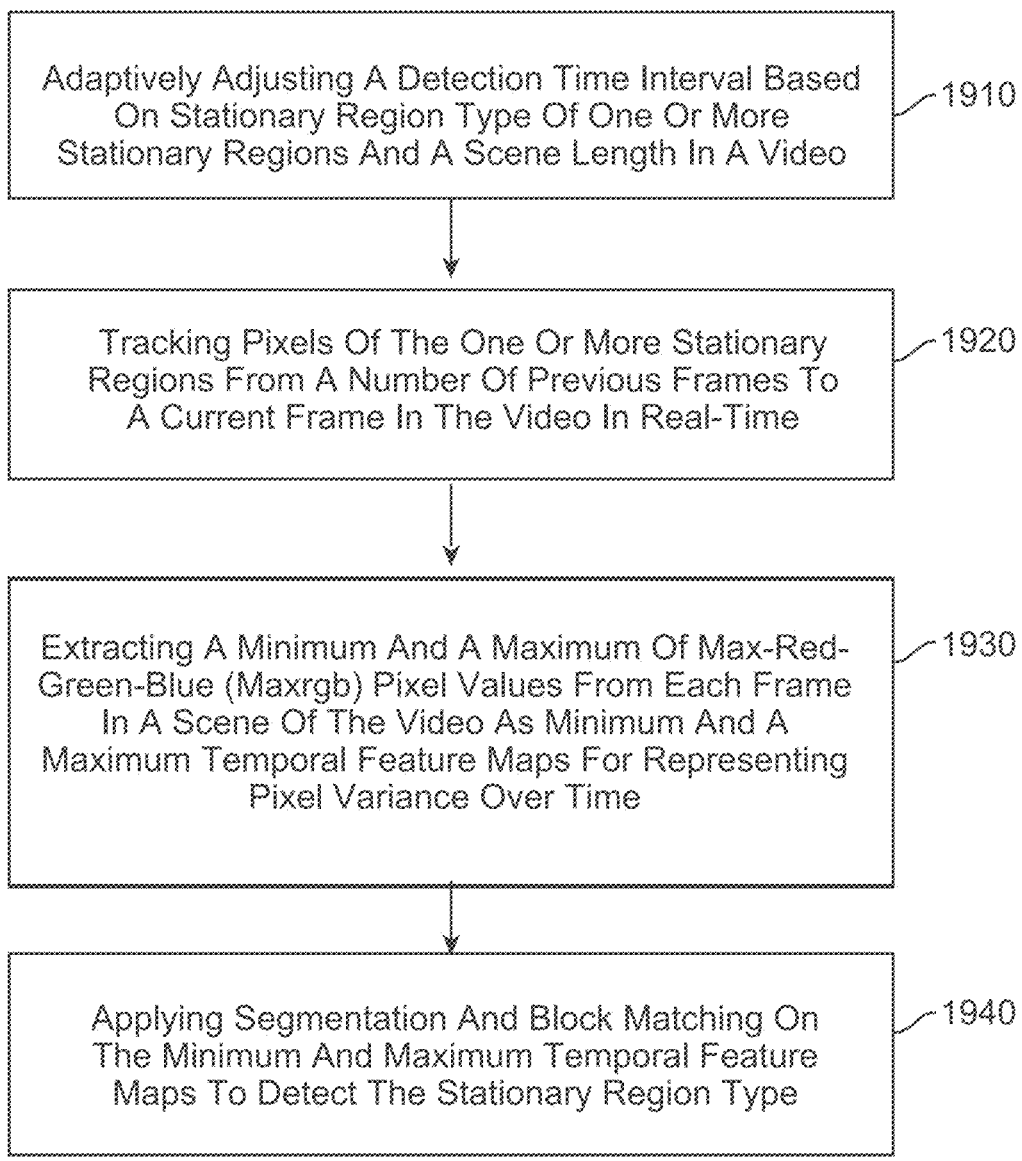
FIG. 19 illustrates a process for slowing OLED burn-in, according to some embodiments.

FIG. 19 illustrates a process 1900 for slowing OLED burn-in, according to some embodiments. In block 1910, process 1900 adaptively adjusting a detection time interval (e.g., stationary detection time interval 725, FIG. 7) based on stationary region type of one or more stationary regions (e.g., common regions 640, FIG. 6, stationary region 720, FIG. 7) and a scene length in a video. In block 1920, process 1900 tracks pixels of the one or more stationary regions from a number of previous frames (e.g., $P_C$ 704, FIG. 7) to a current frame (e.g., $F_C$ 705, FIG. 7) in the video in real-time. In block 1930, process 1900 extracts a minimum and a maximum of MaxRGB pixel values from each frame in a scene of the video as minimum and a maximum temporal feature maps (e.g., maximum feature map 710, minimum feature map 715, FIG. 7) for representing pixel variance over time. In block 1940, process 1900 applies segmentation and block matching (e.g., Adaptive Matching Parameter Adjustment process 750, Segmentation Probability Map process 755, Intensity Based Segmentation process 760, FIG. 7) on the minimum and maximum temporal feature maps to detect the stationary region type.

In some embodiments, process 1900 further provides that tracking the pixels of the one or more stationary regions includes utilizing one or more frame buffers (e.g., frame buffers 430, FIG. 4) to obtain one or more temporal features for detecting the one or more stationary regions from the number of previous scenes to the current scene.

In one or more embodiments, process 1900 further provides that tracking the pixels of the one or more stationary regions further includes: extracting MaxRGB information as spatial information for each frame in a scene of the video, and storing a temporal minimum and a temporal maximum of the MaxRGB information to the one or more frame buffers for each scene.

In some embodiments, process 1900 additionally provides detecting a scene change (e.g., block 730, FIG. 7) for the video based on comparison of the temporal minimum and the temporal maximum of the MaxRGB for a current frame and previous frame.

In one or more embodiments, process 1900 further provides performing an intensity adaptive thresholding process and using an intensity invariant matching metric for detecting translucent logos in the video, where the intensity invariant matching metric comprises an NCC.

In some embodiments, process 1900 additionally provides generating a stationary probability map (e.g., $P_{stationary}$ 770) for the one or more stationary regions; and reducing luminance of pixels in the video based on the stationary probability map for slowing OLED display burn-in.

In one or more embodiments, process 1900 further provides the feature that the detected stationary region type includes one or more of a background image type, an opaque logo type or a translucent logo type.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A computer-implemented method, comprising:
adaptively adjusting a detection time interval based on detection of a stationary region type for one or more stationary regions and a scene length in a video;
tracking pixels of the one or more stationary regions from a number of previous frames to a current frame in the video in real-time;
extracting a minimum and a maximum of max-Red-Green-Blue (MaxRGB) pixel values from each frame in a scene of the video as minimum and a maximum temporal feature maps for representing pixel variance over time;
applying a combination of segmentation and block matching on the minimum and maximum temporal feature maps to detect the stationary region type, wherein the block matching is based on L1 distance; and
generating a stationary probability map for the one or more stationary regions, the stationary probability map is generated based on a graph for a stationary map that is used for a multi-point look up table;
wherein:
block matching is used with a segmentation probability map when an incorrect block matching result around a boundary of a particular stationary region is determined; and
block matching combined with an intensity adaptive thresholding process is used when incorrect block matching results due to a variation of intensity in the particular stationary region are determined.

2. The computer-implemented method of claim 1, wherein:
tracking the pixels of the one or more stationary regions comprises:
utilizing one or more frame buffers to obtain one or more temporal features for detecting the one or more stationary regions from the number of previous scenes to the current scene; and
adaptively adjusting block matching parameters of the current frame prevents ghost artifacts.

3. The computer-implemented method of claim 2, wherein tracking the pixels of the one or more stationary regions further comprises:
extracting MaxRGB information as spatial information for each frame in a scene of the video; and
storing a temporal minimum and a temporal maximum of the MaxRGB information to the one or more frame buffers for each scene.

4. The computer-implemented method of claim 3, further comprising:
detecting a scene change for the video based on comparison of the temporal minimum and the temporal maximum of the MaxRGB for a current frame and previous frame.

5. The computer-implemented method of claim 4, further comprising:
using an intensity invariant matching metric for detecting translucent logos in the video, wherein the intensity invariant matching metric comprises a normalized cross correlation.

6. The computer-implemented method of claim 5, further comprising:
reducing luminance of pixels in the video based on the stationary probability map for slowing organic light emitting diode (OLED) display burn-in;
wherein applying segmentation comprises applying intensity based segmentation, the block matching based on the L1 distance ignores background pixels for improvement of incorrect block matching around a boundary of a stationary region due to the background pixels, and the incorrect block matching result around the boundary of the particular stationary region is due to background pixels.

7. The computer-implemented method of claim 6, wherein:
the detected stationary region type comprises one or more of a background image type, an opaque logo type or a translucent logo type;
the stationary probability map is a segmentation based stationary probability map generated using the applied intensity based segmentation; and
combining the block matching based on the L1 distance with block matching for the normalized cross correlation improves incorrect block matching results due to a variation of intensity in a stationary region.

8. A non-transitory processor-readable medium that includes a program that when executed by a processor performs slowing organic light emitting diode (OLED) display burn-in, comprising:
adaptively adjusting, by the processor, a detection time interval based on a detection of a stationary region type for one or more stationary regions and a scene length in a video;
tracking, by the processor, pixels of the one or more stationary regions from a number of previous frames to a current frame in the video in real-time;
extracting, by the processor, a minimum and a maximum of max-Red-Green-Blue (MaxRGB) pixel values from each frame in a scene of the video as minimum and a maximum temporal feature maps for representing pixel variance over time;
applying, by the processor, a combination of segmentation and block matching on the minimum and maximum temporal feature maps to detect the stationary region type, wherein the block matching is based on L1 distance; and
generating, by the processor, a stationary probability map for the one or more stationary regions, the stationary probability map is generated based on a graph for a stationary map that is used for a multi-point look up table;
wherein:
block matching is used with a segmentation probability map when an incorrect block matching result around a boundary of a particular stationary region is determined; and
block matching combined with an intensity adaptive thresholding process is used when incorrect block matching results due to a variation of intensity in the particular stationary region is determined.

9. The non-transitory processor-readable medium of claim 8, wherein:
tracking the pixels of the one or more stationary regions comprises:
utilizing one or more frame buffers to obtain one or more temporal features for detecting the one or more stationary regions from the number of previous scenes to the current scene; and
adaptively adjusting block matching parameters of the current frame prevents ghost artifacts.

10. The non-transitory processor-readable medium of claim 9, wherein tracking the pixels of the one or more stationary regions further comprises:
extracting, by the processor, MaxRGB information as spatial information for each frame in a scene of the video; and
storing, by the processor, a temporal minimum and a temporal maximum of the MaxRGB information to the one or more frame buffers for each scene.

11. The non-transitory processor-readable medium of claim 10, further comprising:
detecting, by the processor, a scene change for the video based on comparison of the temporal minimum and the temporal maximum of the MaxRGB for a current frame and previous frame.

12. The non-transitory processor-readable medium of claim 11, further comprising:
using an intensity invariant matching metric for detecting translucent logos in the video, wherein the intensity invariant matching metric comprises a normalized cross correlation.

13. The non-transitory processor-readable medium of claim 12, further comprising:
reducing, by the processor, luminance of pixels in the video based on the stationary probability map for slowing OLED display burn-in;
wherein applying segmentation comprises applying intensity based segmentation, and the block matching based on the L1 distance ignores background pixels for improvement of incorrect block matching around a boundary of a stationary region due to the background pixels, and the incorrect block matching result around the boundary of the particular stationary region is due to background pixels.

14. The non-transitory processor-readable medium of claim 13, wherein:
the detected stationary region type comprises one or more of a background image type, an opaque logo type or a translucent logo type;
the stationary probability map is a segmentation based stationary probability map generated using the applied intensity based segmentation; and
combining the block matching based on the L1 distance with block matching for the normalized cross correlation improves incorrect block matching results due to a variation of intensity in a stationary region.

15. An apparatus comprising:
a memory storing instructions; and
at least one processor executes the instructions including a process configured to:
adaptively adjust a detection time interval based on detection of a stationary region type for one or more stationary regions and a scene length in a video;
track pixels of the one or more stationary regions from a number of previous frames to a current frame in the video in real-time;
extract a minimum and a maximum of max-Red-Green-Blue (MaxRGB) pixel values from each frame in a scene of the video as minimum and a maximum temporal feature maps for representing pixel variance over time;
apply a combination of segmentation and block matching on the minimum and maximum temporal feature maps to detect the stationary region type, wherein the block matching is based on L1 distance; and
generate a stationary probability map for the one or more stationary regions, the stationary probability map is generated based on a graph for a stationary map that is used for a multi-point look up table;
wherein:
block matching is used with a segmentation probability map when an incorrect block matching result around a boundary of a particular stationary region is determined; and block matching combined with an intensity adaptive thresholding process is used when incorrect block matching results due to a variation of intensity in the particular stationary region is determined.

16. The apparatus of claim 15, wherein:

tracking the pixels of the one or more stationary regions comprises:

utilizing one or more frame buffers to obtain one or more temporal features for detecting the one or more stationary regions from the number of previous scenes to the current scene; and adaptively adjusting block matching parameters of the current frame prevents ghost artifacts.

17. The apparatus of claim 16, wherein tracking the pixels of the one or more stationary regions further comprises:

extracting MaxRGB information as spatial information for each frame in a scene of the video; and storing a temporal minimum and a temporal maximum of the MaxRGB information to the one or more frame buffers for each scene.

18. The apparatus of claim 17, wherein the process further configured to:

detect a scene change for the video based on comparison of the temporal minimum and the temporal maximum of the MaxRGB for a current frame and previous frame.

19. The apparatus of claim 18, wherein:

the process further configured to:

use an intensity invariant matching metric for detecting translucent logos in the video, wherein the intensity invariant matching metric comprises a normalized cross correlation;

reduce luminance of pixels in the video based on the stationary probability map for slowing organic light emitting diode (OLED) display burn-in; and applying segmentation comprises applying intensity based segmentation;

the block matching based on the L1 distance ignores background pixels for improvement of incorrect block matching around a boundary of a stationary region due to the background pixels; and the incorrect block matching result around the boundary of the particular stationary region is due to background pixels.

20. The apparatus of claim 19, wherein:

the detected stationary region type comprises one or more of a background image type, an opaque logo type or a translucent logo type;

the stationary probability map is a segmentation based stationary probability map generated using the applied intensity based segmentation; and combining the block matching based on the L1 distance with block matching for the normalized cross correlation improves incorrect block matching results due to a variation of intensity in a stationary region.

* * * * *